US009509474B2

(12) United States Patent
Horiuchi et al.

(10) Patent No.: US 9,509,474 B2
(45) Date of Patent: Nov. 29, 2016

(54) COMMUNICATION APPARATUS AND RETRANSMISSION CONTROL METHOD

(71) Applicant: Panasonic Intellectual Property Corporation of America, Torrance, CA (US)

(72) Inventors: Ayako Horiuchi, Kanagawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/886,749

(22) Filed: Oct. 19, 2015

(65) Prior Publication Data

US 2016/0043847 A1    Feb. 11, 2016

Related U.S. Application Data

(63) Continuation of application No. 14/237,820, filed as application No. PCT/JP2012/004789 on Jul. 27, 2012, now Pat. No. 9,197,390.

(30) Foreign Application Priority Data

Aug. 12, 2011 (JP) .................................. 2011-176864

(51) Int. Cl.
*H04W 4/00* (2009.01)
*H04L 5/00* (2006.01)
(Continued)

(52) U.S. Cl.
CPC ........... *H04L 5/0048* (2013.01); *H04L 1/1812* (2013.01); *H04L 1/1822* (2013.01);
(Continued)

(58) Field of Classification Search
None
See application file for complete search history.

(56) References Cited

U.S. PATENT DOCUMENTS 8,036,110 B2   10/2011  Ishii et al.
8,531,962 B2    9/2013  Chen et al.
(Continued)

FOREIGN PATENT DOCUMENTS

CN    101841401 A    9/2010
JP    2010-148149 A   7/2010
(Continued)

OTHER PUBLICATIONS

3GPP TS 36.216 V10.1.0, 3rd Generation Partnership Project; Technical Specification Group Radio Access Network; Evolved Universal Terrestrial Radio Access (E-UTRA); Physical layer for relaying operation (Release 10), Dec. 2010, 15 pages.
(Continued)

*Primary Examiner* — Otis L Thompson, Jr.
(74) *Attorney, Agent, or Firm* — Seed IP Law Group LLP

(57) ABSTRACT

Provided is a wireless communication device. A PHICH reception unit determines whether a received signal in a PHICH region is an ACK signal or a NACK signal. When doing so, the PHICH reception unit does not receive a PHICH in a subframe in which a terminal monitors an E-PDCCH. A control signal reception unit outputs a retransmission prompting signal to a signal allocation unit when the signal outputted from the PHICH reception unit is a NACK signal and when a UL grant was not detected. Meanwhile, when a UL grant was detected, the control signal reception unit outputs the detected UL grant to the signal allocation unit. The signal allocation unit maps the transmission signal in accordance with the retransmission prompting signal and the UL grant and transmits the transmission signal from a wireless transmission unit.

8 Claims, 7 Drawing Sheets

(51) Int. Cl.
*H04L 1/18* (2006.01)
*H04W 72/04* (2009.01)
*H04W 72/14* (2009.01)
*H04L 1/12* (2006.01)

(52) U.S. Cl.
CPC ........... *H04L1/1854* (2013.01); *H04L 1/1887* (2013.01); *H04L 1/1896* (2013.01); *H04L 5/0055* (2013.01); *H04W 72/042* (2013.01); *H04W 72/0413* (2013.01); *H04W 72/14* (2013.01); *H04L 2001/125* (2013.01)

(56) References Cited

U.S. PATENT DOCUMENTS

| | | |
|---|---|---|
| 2009/0268685 A1 | 10/2009 | Chen et al. |
| 2010/0177649 A1 | 7/2010 | Ishii et al. |
| 2010/0254327 A1 | 10/2010 | McBeath et al. |
| 2010/0265906 A1 | 10/2010 | Bucknell et al. |
| 2011/0002309 A1 | 1/2011 | Park et al. |
| 2011/0170499 A1* | 7/2011 | Nayeb Nazar ........ H04L 1/1812 370/329 |
| 2012/0063321 A1* | 3/2012 | Chandrasekhar ..... H04L 1/1896 370/241 |
| 2012/0307744 A1* | 12/2012 | Charbit ............. H04W 72/1205 370/329 |
| 2013/0003672 A1* | 1/2013 | Dinan ....................... H04L 1/00 370/329 |
| 2013/0016692 A1* | 1/2013 | Chen ..................... H04L 5/0094 370/330 |
| 2013/0083749 A1 | 4/2013 | Xu et al. |
| 2013/0114529 A1 | 5/2013 | Chen et al. |
| 2013/0201926 A1 | 8/2013 | Nam et al. |
| 2013/0301545 A1* | 11/2013 | Wang ..................... H04L 5/001 370/329 |
| 2014/0064237 A1 | 3/2014 | Lee et al. |
| 2014/0126517 A1 | 5/2014 | Choi et al. |

FOREIGN PATENT DOCUMENTS

| | | |
|---|---|---|
| JP | 2011-521538 A | 7/2011 |
| WO | 2009/087529 A1 | 7/2009 |
| WO | 2009/108020 A2 | 9/2009 |

OTHER PUBLICATIONS

Alcatel-Lucent, "Multi-Process Transmission Technique to Improve Uplink Coverage for LTE," R1-080443, Agenda Item: 6.1.3, 3GPP TSG-RAN WG1 #51-bis, Sevilla, Spain, Jan. 14-18, 2008, 10 pages.

International Search Report, dated Aug. 21, 2012, for corresponding International application No. PCT/JP2012/004789, 4 pages.

NTT DoCoMo, Mitsubishi Electric, NEC, Sharp, "Semi-static Configuration of Non-adaptive and Adaptive HARQ in E-UTRA Downlink," R1-074811, Agenda Item: 6.2.3, 3GPP TSG RAN WG1 Meeting #51, Jeju, Korea, Nov. 5-9, 2007 (Original R1-073698), 2 pages.

Chinese Search Report, dated Aug. 31, 2016, corresponding to CN Application No. 2012800387920, 2 pages.

* cited by examiner

COMMUNICATION APPARATUS AND RETRANSMISSION CONTROL METHOD

BACKGROUND

1. Technical Field

The present invention relates to a communication apparatus performing a retransmission control and also to a retransmission control method.

2. Description of the Related Art

In recent years, it has been become common to transmit not only audio data but also large-volume data such as still-image data and video data in cellular mobile communication systems in connection with the increasing development of multimedia information. Moreover, in LTE-Advanced (hereinafter referred to as "LTE-A"), techniques enabling a high transmission rate using a broad radio band, a MIMO (Multiple-Input Multiple-Output) transmission technique, and an interference control technique have actively been discussed in order to enable transmission of large-volume data.

Furthermore, various apparatuses are introduced as radio communication terminals in, for example, M2M (Machine to Machine) communication, or the multiplex number of a terminal increases with a MIMO technique, thereby causing anxiety about a shortage of resources in a region used for a control signal (PDCCH: Physical Downlink Control Channel). If a control signal cannot be mapped due to this shortage of resources, data cannot be assigned to the terminal. As a result, even if a data region used as a resource region for mapping data is available, the area cannot be used, so that a concern arises that the system throughput may decrease.

As a way of solving this problem, mapping a control signal toward a terminal served the base station to a data region has been discussed. The data region to which the base station maps control signals toward terminals served by the base station are called, for example, an E-PDCCH (Enhanced PDCCH) region, N-PDCCH (New-PDCCH) region, or X-PDCCH region.

Thus, mapping a control signal to a data region enables controlling the transmission power for a control signal to be transmitted to a terminal located near a cell edge, the interference given to other cells by a control signal to be transmitted or interference given to the cell provided by the base station from another cell.

However, PHICH (Physical HARQ Indicator Channel) used for uplink (UL) retransmission control transmitted in downlink (DL) indicates an ACK/NACK, but the number of bits used herein is small, so that transmission using a data region results in inefficiency.

Next, a UL retransmission control method of LTE will be described. In LTE, a DL grant (referred to also as DL assignment) serving as DL assignment control information indicating DL data assignment, and a UL grant serving as UL assignment control information indicating UL data assignment are transmitted on a PDCCH. DL assignment is used to indicate that a resource in the subframe used for transmitting this DL assignment has been allocated to the terminal.

On the other hand, regarding a UL grant, in a FDD (Frequency Division Duplex) system, a UL grant is used to indicate that a resource in the target subframe which is the fourth subframe from the subframe used for transmitting this UL grant has been allocated to the terminal.

Moreover, in a TDD (Time Division Duplex) system, a UL grant is used to indicate that a resource in the target subframe which is the fourth subframe or a subframe after the fourth subframe from the subframe used for transmitting this UL grant has been allocated to the terminal. In the TDD system, after how many subframes from the subframe used for transmitting the UL grant, a subframe is allocated to the terminal as a UL subframe is determined according to a pattern of time-dividing UL and DL (hereinafter, "UL/DL configuration pattern"). However, in any UL/DL configuration pattern, the UL subframe is the fourth subframe or a subframe after the fourth subframe from the subframe used for transmitting the UL grant.

The UL retransmission control supports non-adaptive retransmission for assigning a retransmission signal to the same resource as the resource allocated last time and adaptive retransmission capable of assigning a retransmission signal to a resource different from the resource to which the signal is assigned last time (for example, refer to Non-Patent Literature (hereinafter, abbreviated as NPL) 1). In the non-adaptive retransmission, only a PHICH for transmitting an ACK/NACK signal is used as a retransmission control signal, and a NACK is transmitted through the PHICH to request retransmission. When retransmission is not requested, an ACK is transmitted through the PHICH. Retransmission can be indicated only through a PHICH in the non-adaptive retransmission, which in turn, provides an advantage of a low overhead for the control signal transmitted through DL needed in order to indicate retransmission.

Moreover, in the adaptive retransmission, an ACK is transmitted through a PHICH while retransmission and a resource for retransmission are indicated with a UL grant for indicating resource allocation information. A UL grant has a bit called an NDI (New Data Indicator), and this bit takes a binary value of 0 or 1. The terminal compares the NDI of a received current UL grant with the NDI of the last UL grant in the same retransmission process (HARQ (Hybrid ARQ) process). If there is a change in the NDI, the terminal judges that new data is assigned. If there is no change in the NDI, the terminal judges that retransmission data is assigned. In the adaptive retransmission, the resource amount and MCS (Modulation and Coding Scheme) can be changed according to a required SINR (Signal-to-Interference and Noise power Ratio) of the retransmission signal, which therefore provides an advantage of improving the frequency use efficiency.

A UL grant includes CRC (Cyclic Redundancy Check) and therefore the reliability of the received signal is high in comparison with a PHICH. Thus, when receiving a PHICH and a UL grant, the terminal follows an indication of the UL grant.

FIG. 1 illustrates a UL retransmission control procedure in a terminal. In FIG. 1, at Step (hereinafter abbreviated as "ST") 11, whether a UL grant exists is determined. If a UL grant exists (YES), the process shifts to ST12. If a UL grant does not exist (NO), the process shifts to ST15.

In ST12, the NDI of the current UL grant is compared to the NDI of the last UL grant in the same retransmission process to determine whether the NDI changes. If the NDI changes (YES), the process shifts to ST13. If the NDI does not change (NO), the process shifts to ST14

In ST13, new data is transmitted to the base station. In ST14, retransmission data is adaptively retransmitted to the base station.

In ST15, whether a PHICH is NACK is determined. If the PHICH is NACK (YES), the process shifts to ST16. If the PHICH is not NACK (NO), the process shifts to ST17.

In ST16, retransmission data is non-adaptively retransmitted to the base station. In ST17, the process is shift to suspending, i.e., retransmission control is suspended.

Here, mapping of a PHICH will be explained. First, in encoding of a PHICH, an ACK/NACK (1 bit) is subject to three times repetition. The number of PHICHs is one of {⅙, ½, 1, 2} times as many as the number of RBs and is indicated through a PBCH (Physical Broadcast Channel). By code multiplex with SF=4 and IQ multiplex, eight PHICHs can be transmitted with 3 REGs (=12 REs). Eight PHICHs placed at 3 REGs are called a PHICH group.

Mapping of a PHICH is dependent on a cell ID. Therefore, an interference control with other cells is difficult, and a PHICH interferes with PDCCHs of other cells and/or a CRS (Cell-specific Reference Signal). All 3 REGs included in a PHICH may be mapped to OFDM symbol #0, or the REGs may be respectively mapped to OFDM symbols #0, #1, and #2 as illustrated in FIG. 2. Information representing which mapping is used is indicated using broadcast information.

In LTE and LTE-A, each RB (Resource Block) consists of 12 subcarriers×0.5 msec, and the unit of combination of two RBs in the time domain is called an RB pair. Therefore, an RB pair consists of 12 subcarriers×1 msec. When representing a block of 12 subcarriers in the frequency domain, the RB pair may only be called an RB. Moreover, the unit of one subcarrier×one OFDM symbol is called one RE (Resource Element). Moreover, one REG (Resource Element Group) includes four REs.

Under the premise described above, NPL 1 proposes that, since the reception quality of a PHICH is inadequate in a terminal at a cell edge, adaptive retransmission without using a PHICH is set in a higher layer. When only adaptive retransmission is supported without using a PHICH, retransmission is controlled only with a UL grant. Therefore, raising the aggregation level of the UL grant can improve the reception quality of a terminal at a cell edge.

Moreover, in NPL 2, the operation without using a PHICH is applied in a backhaul between a base station and a relay station. This is because a relay station transmits a control signal region to a terminal and thus does not receive a PHICH for the purpose of preventing interference due to coupling loop.

In this way, whether or not to use a PHICH is determined in units of terminals or systems in NPL 1 and NPL 2.

CITATION LIST

Non-Patent Literature

NPL 1
R1-074811 Semi-static Configuration of Non-adaptive and Adaptive HARQ in E-UTRA Downlink
NPL 2
3GPP TS 36.216 V10.1.0 Physical layer for relaying operation

BRIEF SUMMARY

Technical Problem

However, subframes having various characteristics are introduced in LTE-A, and whether use of a PHICH is suitable is dependent on a subframe. Therefore, when a PHICH is used with a subframe unsuitable for use of a PHICH, the reception quality of PHICH may decrease, for example, due to interference with a PHICH from another cell, or interference may be given to another cell. As a result, there arises a problem of a decrease in system throughput.

It is an object of the present invention to provide a communication apparatus and a retransmission control method that avoid a decrease in system throughput due to use of a PHICH.

Solution to Problem

A communication apparatus according to an aspect of the present invention includes: a physical HARQ indicator channel (PHICH) receiving section that, when receiving a PHICH including an ACK or NACK transmitted from another communication apparatus, does not receive the PHICH in units of communication in which the communication apparatus monitors an enhanced physical downlink control channel (E-PDCCH), but receives the PHICH in units of communication in which the communication apparatus does not monitor an E-PDCCH; and a retransmission control section that controls whether to perform retransmission to the other communication apparatus, based on the received PHICH and assignment control information.

A communication apparatus according to an aspect of the present invention includes: a physical HARQ indicator channel (PHICH) receiving section that, when receiving a PHICH including an ACK or NACK transmitted from another communication apparatus, does not receive a PHICH corresponding to a physical uplink shared channel (PUSCH) assigned by assignment control information on an enhanced physical downlink control channel (E-PDCCH), but receives a PHICH corresponding to a PUSCH assigned by assignment control information on a PDCCH; and a retransmission control section that controls whether to perform retransmission to the other communication apparatus, based on the received PHICH and assignment control information.

A retransmission control method according to an aspect of the present invention includes: when a physical HARQ indicator channel (PHICH) including an ACK or NACK transmitted from a first communication apparatus is received, not receiving by a second communication apparatus, the PHICH in units of communication in which the second communication apparatus monitors an enhanced physical downlink control channel (E-PDCCH), but receiving by the second communication apparatus, the PHICH in units of communication in which the second communication apparatus does not monitor an E-PDCCH; and controlling whether to perform retransmission to the first communication apparatus, based on the received PHICH and assignment control information.

A retransmission control method according to an aspect of the present invention includes: when a physical HARQ indicator channel (PHICH) including an ACK or NACK transmitted from a first communication apparatus is received, not receiving by a second communication apparatus, a PHICH corresponding to a physical uplink shared channel (PUSCH) assigned to the second communication apparatus by assignment control information on an enhanced physical downlink control channel (E-PDCCH), but receiving by the second communication apparatus, a PHICH corresponding to a PUSCH assigned to the second communication apparatus by assignment control information on a PDCCH; and controlling whether to perform retransmission to the first communication apparatus, based on the received PHICH and assignment control information.

Advantageous Effects of Invention

The present invention makes it possible to avoid a decrease in system throughput due to use of a PHICH.

DETAILED DESCRIPTION

Figure 1:
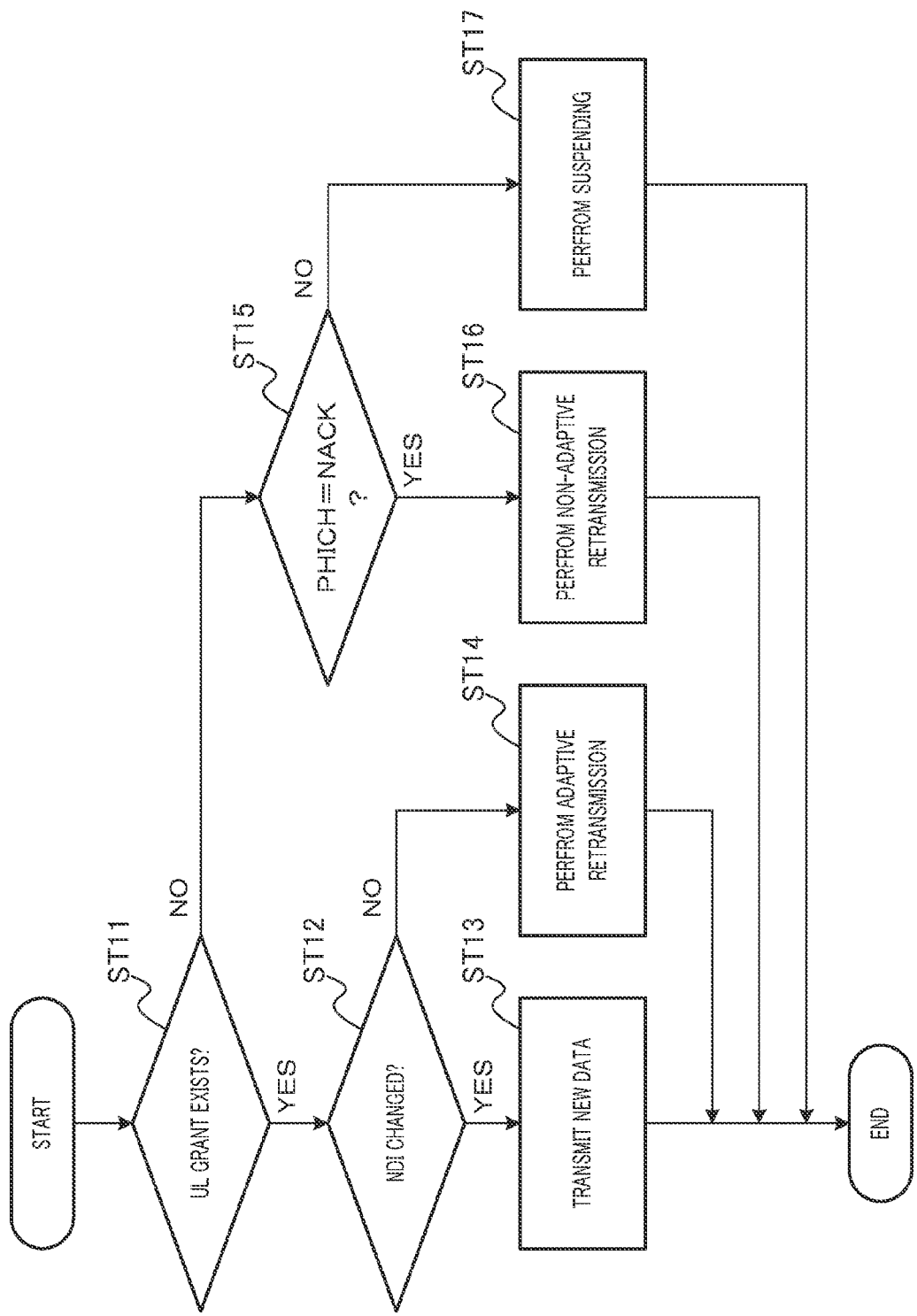
FIG. 1 is a flow diagram illustrating a UL retransmission control procedure according to the relate art.
Figure 2:
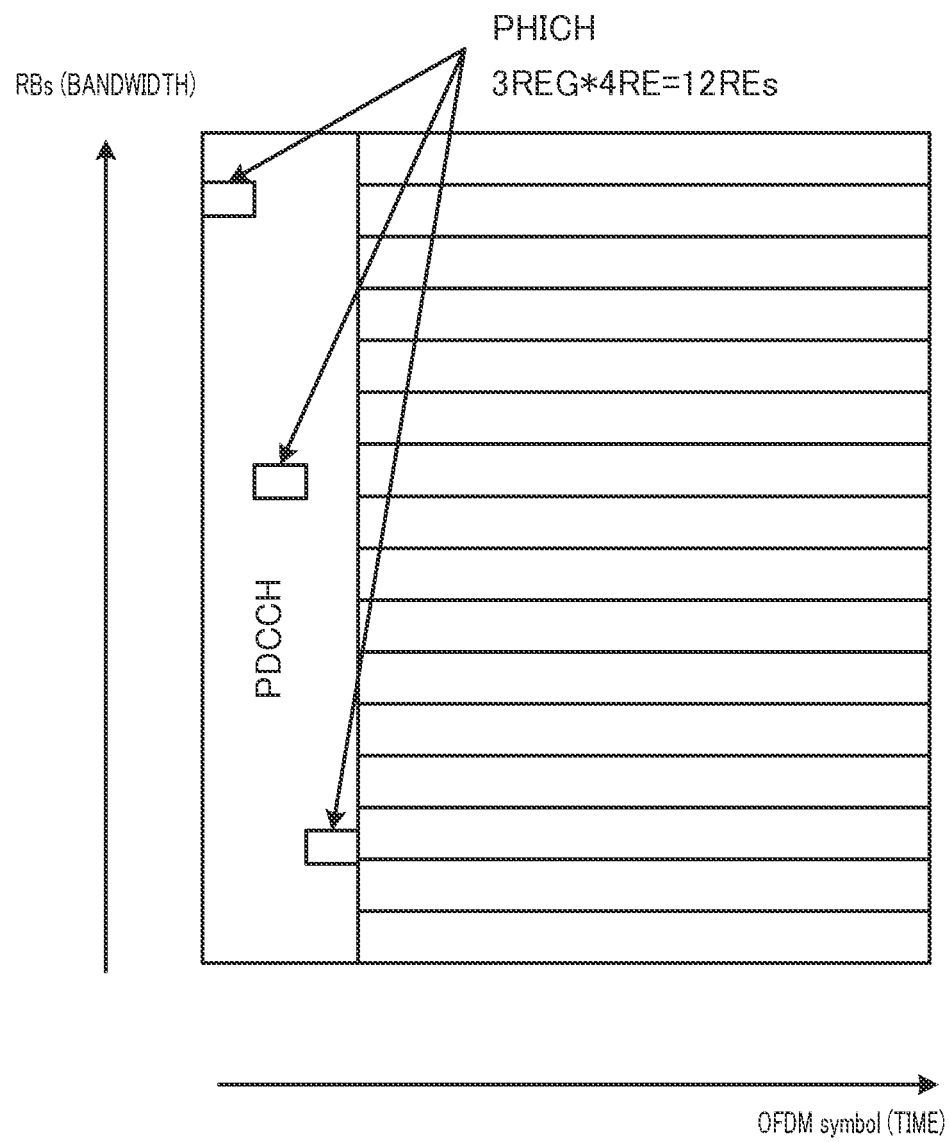
FIG. 2 illustrates mapping of PHICHs.

The inventors of the present invention have accomplished the present invention with a focus on the following points (1) to (4) as a subframe incapable of receiving a PHICH or unsuitable for transmitting a PHICH and also with a focus on the following point (5) as a subframe suitable for a PHICH. Hereinafter, (1) to (5) will be explained.

(1) Subframe Transmitting Control Signal Via E-PDCCH Using Beamforming

A terminal at a cell edge can barely receive an E-PDCCH because of beamforming, but cannot receive a PHICH because power boosting cannot be used for a PHICH.

(2) Extension Carrier (Carrier without PDCCH Region)

In an extension carrier, if a PHICH region is not set in a case where a control signal is transmitted using an E-PDCCH, OFDM symbol #0 can be used as an E-PDCCH. Meanwhile, it is easier to use an extension carrier when data is assigned from OFDM symbol #0.

(3) Interference Control

Interference control for E-PDCCH can be performed in the frequency domain. However, the position of a resource allocated to a PHICH is dependent on the cell ID, so that interference control is difficult. For this reason, the reception quality of a PHICH decreases in a subframe with large interference from another cell. Moreover, no PHICH should be transmitted in a subframe that should not cause interference with other cells because a PHICH can be the source of interference.

Moreover, the cycle (8 msec cycle in FDD) of UL HARQ process may not match the cycle of interference control. When an MBSFN (MBMS Single Frequency Network) subframe is set to an ABS (Almost Blank Subframe) in FDD, the MBSFN subframe is limited to #0, 4, 5, and 9 subframes. Accordingly, the cycle of UL HARQ process does not match the cycle of interference control. Therefore, even if a UL grant transmitted in a subframe without interference, a PHICH may be transmitted in a subframe after 8 msec which causes large interference.

(4) CoMP (Cooperative Multi-Point) (Reception of Control Signals from Multiple Cells)

In particular, in a scenario called CoMP scenario 4 for transmitting signals from multiple transmission points having the same cell ID, PHICHs are subject to channel estimation with CRSs and are to be transmitted from all transmission points. Therefore, the number of PHICHs may be insufficient. Moreover, PHICHs are transmitted from multiple transmission points, so that there is a problem of an increase in interference with other cells.

(5) Control Signals in MU-MIMO (Multi User MIMO)

In a cell using MU-MIMO, signals for a plurality of terminals can be multiplexed and transmitted via a data channel. On the other hand, control signals are transmitted individually to the terminals, so that there is a problem of an increase in the amount of control signal. In such a case, a PHICH enables transmission by multiplexing signals of a plurality of terminals with a small amount of signal and is therefore effective in reducing the overhead for control signals.

Figure 3:
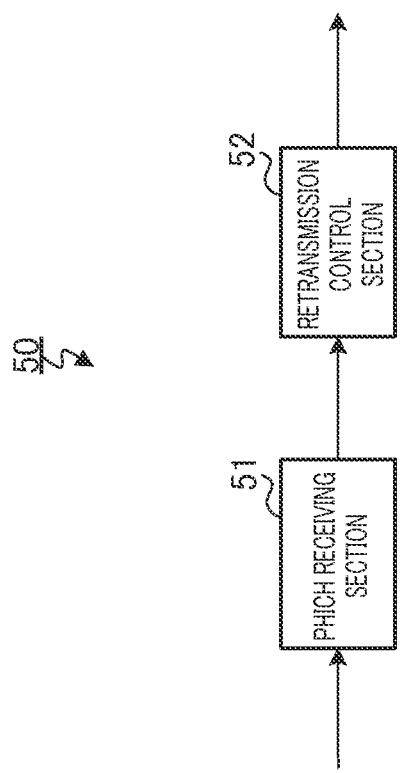
FIG. 3 is a block diagram illustrating the main configuration of a radio communication apparatus according to the present invention.

A main configuration of radio communication apparatus 50 according to the present invention will be explained with reference to FIG. 3. In FIG. 3, PHICH receiving section 51 receives a PHICH including an ACK or NACK transmitted from a communication apparatus of the other party and outputs the received PHICH to retransmission control section 52. However, PHICH receiving section 51 does not receives PHICH in a subframe in which radio communication apparatus 50 monitors an E-PDCCH.

Retransmission control section 52 controls whether to perform retransmission to the communication apparatus of the other party on the basis of the PHICH outputted from PHICH receiving section 51 and assignment control information.

Hereinafter, the embodiments according to the present invention will be explained in detail with reference to the accompanying drawings.

Embodiment 1

A communication system according to Embodiment 1 of the present invention includes a transmitting apparatus and a receiving apparatus. In particular, Embodiment 1 of the present invention will be explained with the transmitting apparatus as base station 100 and the receiving apparatus as terminal 200. This communication system is an LTE-A system, for example. Additionally, base station 100 is, for example, an LTE-A base station, and terminal 200 is, for example, an LTE-A terminal.

Figure 4:
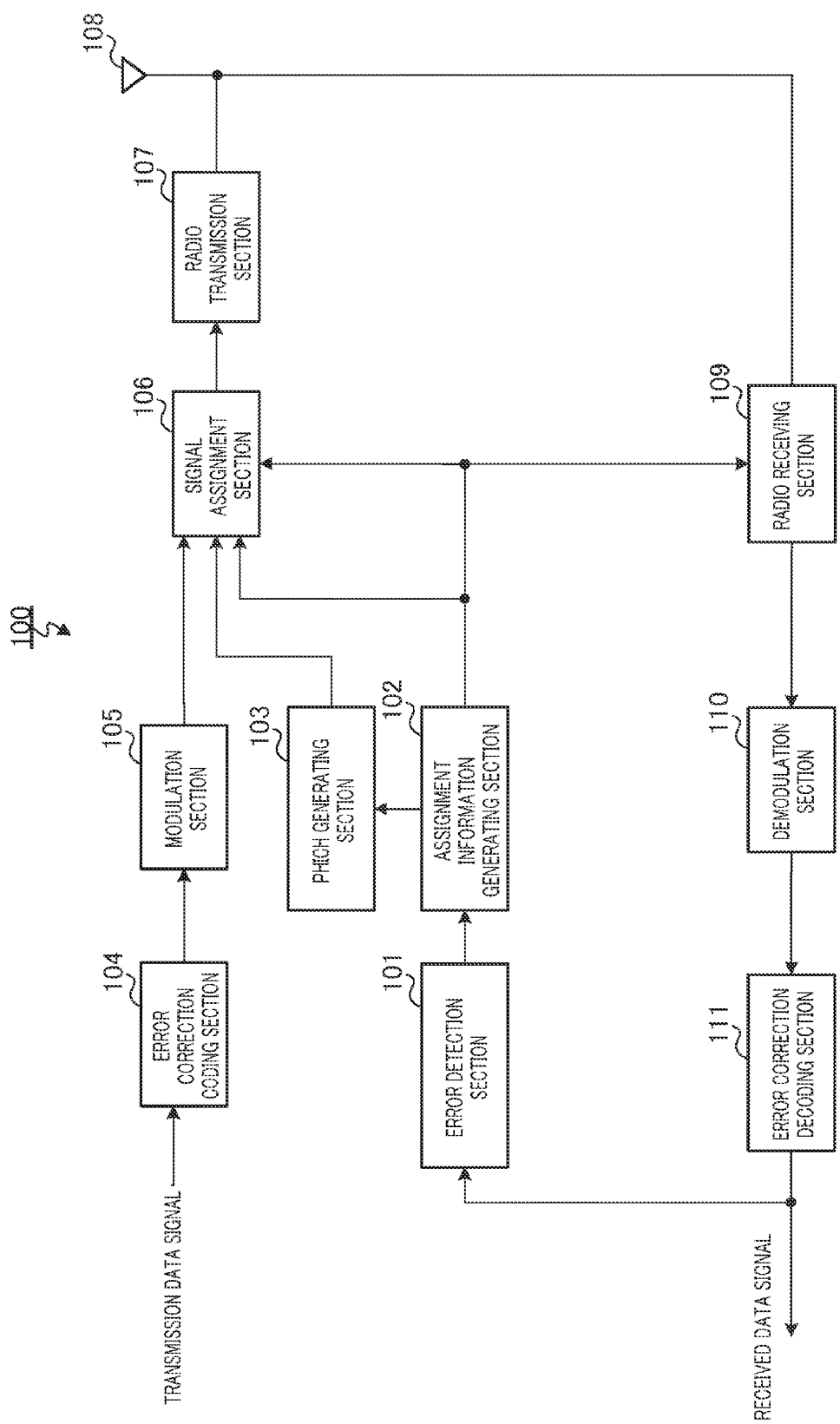
FIG. 4 is a block diagram illustrating the configuration of a base station according to Embodiment 1 of the present invention.

FIG. 4 is a block diagram illustrating a configuration of base station 100 according to Embodiment 1 of the present invention. In this drawing, error detection section 101 receives as input a received data signal outputted from error correction decoding section 111 described below and detects whether the reception data includes an error using a CRC or the like. The detection result is outputted to assignment information generating section 102.

When a data signal to be transmitted through the DL exists, assignment information generating section 102 determines a resource for assigning the data signal and generates DL assignment as assignment information. Moreover, when a data signal to be assigned to the UL exists, assignment information generating section 102 determines a resource for assigning the data signal and generates a UL grant as assignment information. The generated assignment information is outputted as information to be transmitted through an E-PDCCH or PDCCH to signal assignment section 106.

Moreover, the UL grant is outputted to radio receiving section 109 in order to receive UL data.

Moreover, assignment information generating section 102 judges whether to retransmit a signal based on the determination result outputted from error detection section 101. When retransmission is not necessary, or when no signal needs to be adaptively retransmitted, assignment information generating section 102 instructs PHICH generating section 103 to generate an ACK. When non-adaptively retransmitting a signal, assignment information generating section 102 instructs PHICH generating section 103 to generate a NACK.

PHICH generating section 103 generates an ACK or NACK according to an instruction from assignment information generating section 102. However, in the present embodiment, since whether to transmit a PHICH changes for each subframe, the generated ACK or NACK is outputted to signal assignment section 106 only in a subframe for transmitting a PHICH. Here, in a subframe in which the terminal monitors an E-PDCCH, PHICH generating section 103 stops generation of a PHICH and outputs no PHICH.

Error correction coding section 104 receives as an input a transmission data signal, performs error correction coding on the received transmission data signal and outputs the signal to modulation section 105.

Modulation section 105 modulates the signal outputted from error correction coding section 104 and outputs the modulation signal to signal assignment section 106.

Signal assignment section 106 maps the modulation signal outputted from modulation section 105 to a resource on the basis of DL assignment outputted from assignment information generating section 102. Moreover, signal assignment section 106 assigns the DL assignment and UL grant outputted from assignment information generating section 102 to an E-PDCCH region. Furthermore, when a PHICH is outputted from PHICH generating section 103, signal assignment section 106 also assigns the PHICH.

The transmission signal is thus generated by assigning the transmission data signal, assignment information and PHICH to predetermined resources. The generated transmission signal is outputted to radio transmission section 107.

Radio transmission section 107 performs a predetermined radio transmission process such as up-conversion on the transmission signal outputted from signal assignment section 106 and transmits the processed signal via an antenna 108.

Radio receiving section 109 receives a signal transmitted from the terminal via antenna 108 and performs a predetermined radio reception process such as down-conversion on the received signal. Then, radio receiving section 109 demultiplexes the signal transmitted from the terminal on the basis of UL grant outputted from assignment information generating section 102 and outputs the demultiplexed signal to demodulation section 110.

Demodulation section 110 performs a demodulation process on the signal outputted from radio receiving section 109 and outputs the resultant demodulation signal to error correction decoding section 111.

Error correction decoding section 111 decodes the demodulation signal outputted from demodulation section 110 and acquires a received data signal. The acquired received data signal is outputted to error detection section 101.

Figure 5:
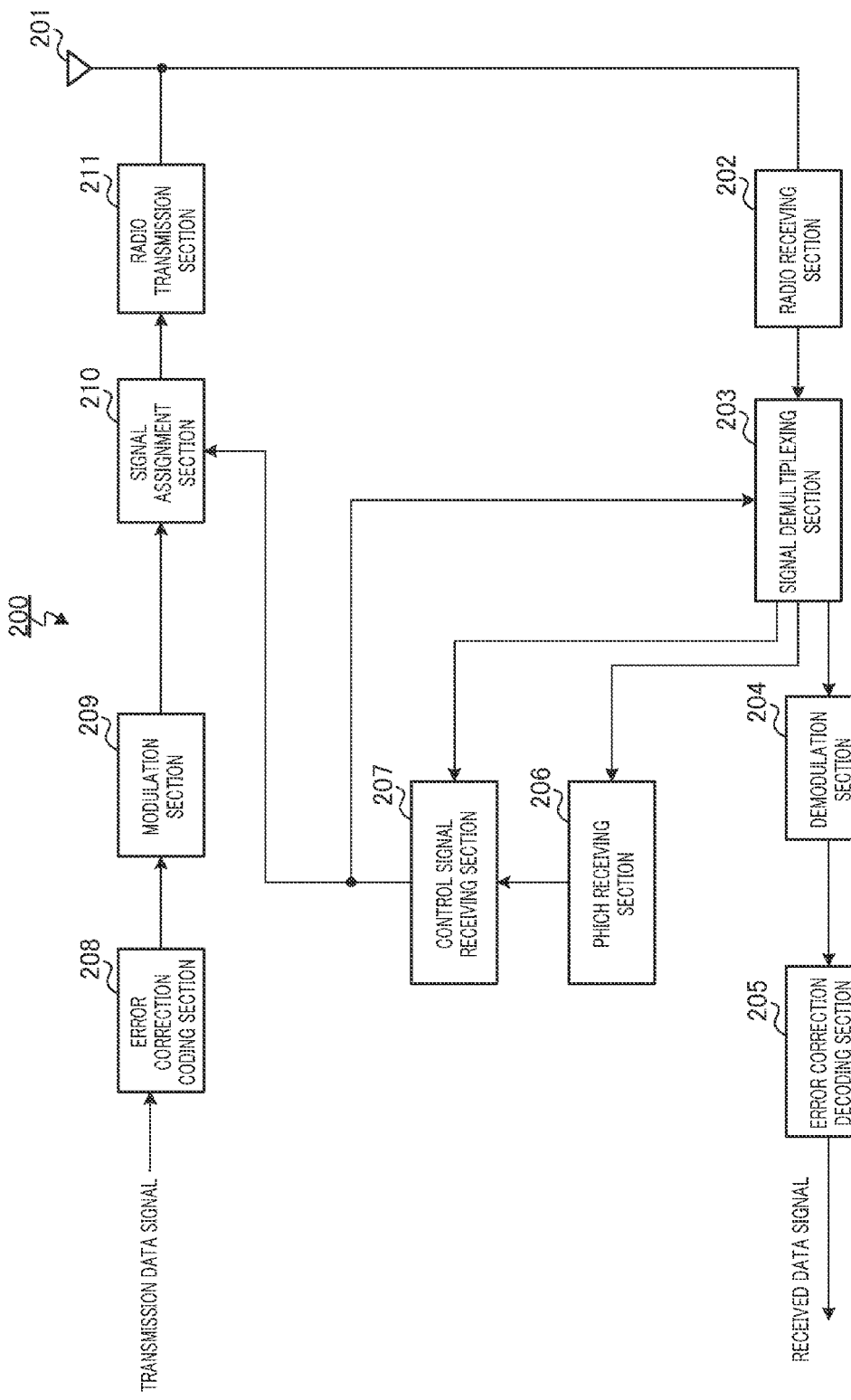
FIG. 5 is a block diagram illustrating the configuration of a terminal according to Embodiment 1 of the present invention.

FIG. 5 is a block diagram illustrating a configuration of terminal 200 according to Embodiment 1 of the present invention. In this drawing, radio receiving section 202 receives a signal transmitted from the base station via antenna 201, performs a predetermined radio reception process such as down-conversion on the signal and outputs the signal resulting from the radio reception process to signal demultiplexing section 203.

Signal demultiplexing section 203 extracts a control signal and the signal of the PHICH region from the signal outputted from radio receiving section 202 and outputs the extracted control signal and the signal of the PHICH region to control signal receiving section 207 and PHICH receiving section 206, respectively.

Moreover, signal demultiplexing section 203 extracts from the received signal a signal (that is, DL data signal) assigned to a data resource indicated by mapping resource pattern information outputted from control signal receiving section 207 described below and outputs the extracted signal to demodulation section 204.

Demodulation section 204 demodulates the signal outputted from signal demultiplexing section 203, and outputs the demodulation signal to error correction decoding section 205.

Error correction decoding section 205 decodes the demodulation signal outputted from demodulation section 204 and outputs the acquired received data signal.

PHICH receiving section 206 determines whether the signal of the PHICH region is ACK or NACK. In the present embodiment, since whether to receive a PHICH changes for each subframe, the determination is performed only in a subframe for receiving a PHICH. The ACK or NACK based on the determination result is outputted to control signal receiving section 207. In addition, in a subframe for receiving no PHICH, an ACK is outputted to control signal receiving section 207. Here, in a subframe in which terminal 200 monitors an E-PDCCH, terminal 200 receives no PHICH.

Control signal receiving section 207 performs blind decoding on the control signal extracted by signal demultiplexing section 203 and detects a control signal intended for the terminal, i.e., DL assignment or UL grant. Control signal receiving section 207 outputs the detected DL assignment to signal demultiplexing section 203 and outputs the detected UL grant to signal assignment section 210.

Control signal receiving section 207 also serves as a retransmission control section and outputs a signal indicating non-adaptive retransmission to signal assignment section 210, when the signal outputted from PHICH receiving section 206 is NACK and also when no UL grant is detected. Moreover, when the signal outputted from PHICH receiving section 206 is ACK and also when no UL grant is detected, control signal receiving section 207 does not output a signal indicating the assignment to signal assignment section 210.

Error correction coding section 208 receives as an input transmission data signal, performs error correction coding on the received transmission data signal and outputs the signals to modulation section 209.

Modulation section 209 modulates the signal outputted from error correction coding section 208 and outputs the modulation signal to signal assignment section 210.

If a UL grant is outputted from control signal receiving section 207, signal assignment section 210 compares the NDI of the current UL grant with the NDI of the last UL grant in the same retransmission process. Then, if the NDI changes, signal assignment section 210 judges that new data is assigned and maps the modulation signal of the new data outputted from modulation section 209 according to the UL grant. On the other hand, if the NDI does not change, signal assignment section 210 judges that retransmission data is assigned and maps the modulation signal of the retransmission data outputted from modulation section 209 according to the UL grant. Furthermore, if retransmission instruction signals are inputted, signal assignment section 210 maps the modulation signal of the retransmission data outputted from modulation section 209 according to the last UL grant in the same retransmission process. The mapped signal is outputted to radio transmission section 211 as a transmission signal.

Radio transmission section 211 performs a predetermined radio transmission process such as up-conversion on the transmission signal outputted from signal assignment section 210 and transmits the processed signal via an antenna 201.

In this way, in PHICH generating section 103 of the base station and PHICH receiving section 206 of the terminal described above, it is defined that no PHICH is used in a subframe in which an E-PDCCH is monitored. Therefore, the terminal performs adaptive retransmission in response to an instruction of retransmission by the UL grant in a subframe in which an E-PDCCH is monitored, without receiving a PHICH. An E-PDCCH is used also for the purpose of interference control. In this case, a subframe using an E-PDCCH is a subframe receiving interference or causing interference.

Accordingly, it is made possible to prevent using a PHICH difficult to be received in a subframe receiving interference from another cell or causing interference to another cell by a PHICH in a subframe causing interference. In this way, when interference control is performed in units of cells, Embodiment 1 is effective in particular.

In addition, in a subframe in which an E-PDCCH is monitored, a resource subject to interference control in the frequency domain can be used to transmit a UL grant. In the present embodiment, since no PHICH is used in a subframe in which an E-PDCCH is monitored, no PHICH is used even if a UL grant is received via a PDCCH or an E-PDCCH, when an E-PDCCH and a PDCCH are used together.

Figure 6:
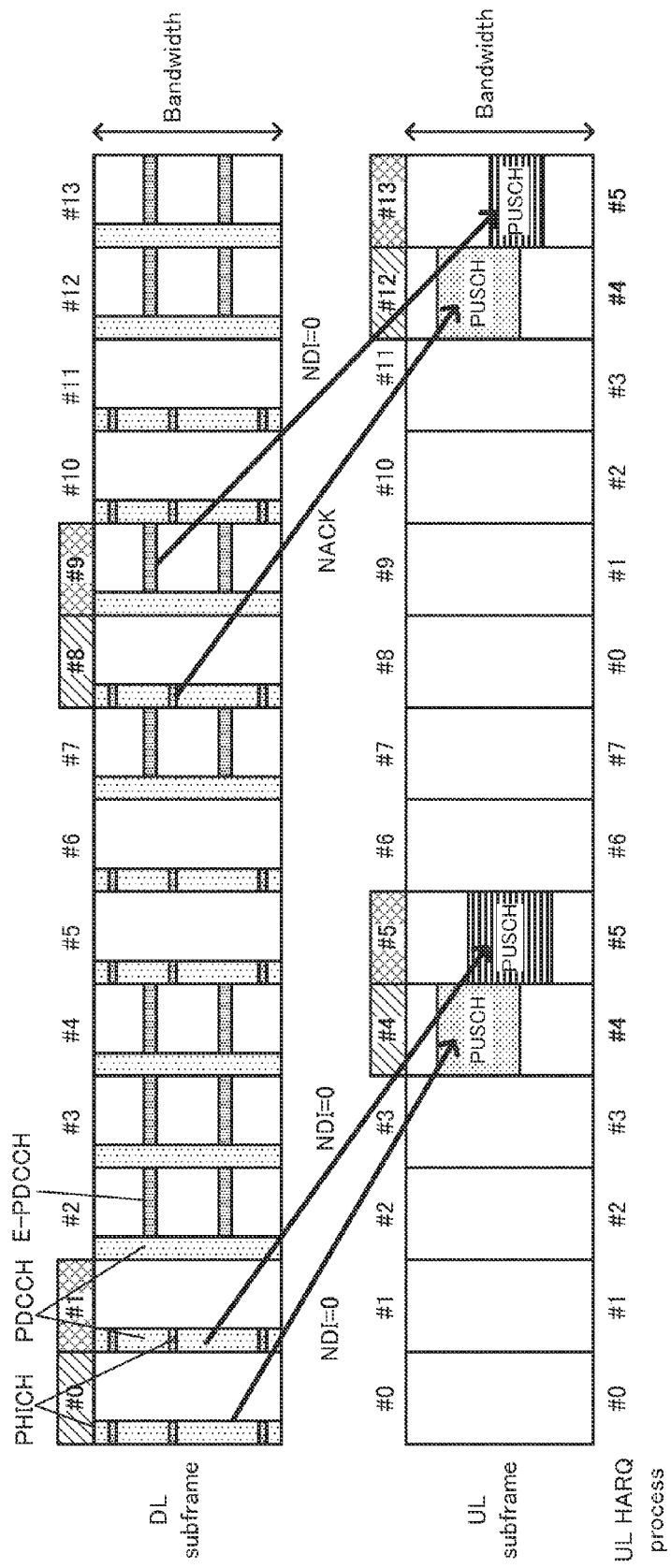
FIG. 6 illustrates an explanation of a retransmission control according to Embodiment 1 of the present invention.

Next, a retransmission control between base station 100 illustrated in FIG. 4 and terminals 200 illustrated in FIG. 5 will specifically be explained taking FDD as an example with reference to FIG. 6.

In FDD, the UL HARQ process cycle is eight subframes. For example, in DL subframes #2 to 4, 7, 9, 12 and 13, the terminal is configured to monitor an E-PDCCH. A PDCCH is also used concomitantly in a subframe in which an E-PDCCH is monitored. In DL subframes #2 to 4, 7, 9, 12 and 13, the terminal receives no PHICH. However, the base station may transmit a PHICH for a conventional terminal.

The terminal receives a PHICH in a subframe in which no E-PDCCH is monitored, and therefore receives a PHICH in DL subframes #0, 1, 5, 6, 8, 10 and 11.

In FIG. 6, a new PUSCH of UL subframe #4 is assigned by the UL grant in the PDCCH region of DL subframe #0. UL subframe #4 corresponds to UL HARQ process #4. Similarly, a new PUSCH of UL subframe #5 is assigned by the UL grant of the PDCCH region of DL subframe #1. UL subframe #5 corresponds to UL HARQ process #5.

The retransmission instruction for the PUSCH transmitted in UL subframe #4 is issued in DL subframe #8, which corresponds to the fourth subframe from UL subframe #4. Additionally, the retransmission instruction for the PUSCH transmitted in UL subframe #5 is issued in DL subframe #9, which corresponds to the fourth subframe from UL subframe #5.

Since DL subframe #8 is not a subframe in which an E-PDCCH is monitored, the terminal receives a PHICH. Therefore, if receiving PHICH=NACK and not detecting a UL grant on a PDCCH or E-PDCCH, the terminal transmits a retransmission signal in UL subframe #12 (UL HARQ process #4) using the same resource (by non-adaptive retransmission).

On the other hand, since DL subframe #9 is a subframe in which an E-PDCCH is monitored, the terminal does not receive a PHICH. Therefore, the transmission of a retransmission signal is instructed through a PDCCH or E-PDCCH. Here, the retransmission instruction is received with the UL grant including NDI=0 (no change in NDI from the last assignment) through the E-PDCCH. Therefore, in UL subframe #13, the retransmission signal is transmitted using the indicated resource (by adaptive retransmission).

In this way, according to Embodiment 1, it is defined that no PHICH is used in a subframe in which the terminal monitors an E-PDCCH. Therefore, the UL grant indicates the retransmission instruction in this case, so that it is made possible to prevent using a PHICH difficult to be received in a subframe receiving interference from another cell or causing interference to another cell by a PHICH in a subframe causing interference. As a result, it is made possible to avoid a decrease in throughput due to use of a PHICH.

Embodiment 2

The configuration of a base station according to Embodiment 2 of the present invention is the same as the configuration illustrated in FIG. 4 of Embodiment 1 except for the operation of PHICH generating section 103. Therefore, only PHICH generating section 103 will be explained with reference to FIG. 4.

PHICH generating section 103 generates an ACK or NACK signal according to an instruction from assignment information generating section 102. However, in the present embodiment, since whether to transmit a PHICH changes for each subframe, the generated ACK or NACK is outputted to signal assignment section 106 only in a subframe in which a PHICH is transmitted. Here, generation of a PHICH serving as a retransmission instruction for the PUSCH to which a resource is assigned by the UL grant through an E-PDCCH is stopped, and no PHICH is outputted in this case.

The configuration of a terminal according to Embodiment 2 of the present invention is the same as the configuration illustrated in FIG. 5 of Embodiment 1 except for the operation of PHICH receiving section 206. Therefore, only PHICH receiving section 206 will be explained with reference to FIG. 5.

PHICH receiving section 206 determines whether the signal in the PHICH region is ACK or NACK. In the present embodiment, since whether to receive a PHICH changes for each subframe, the determination is performed only in a subframe in which a PHICH is received. The ACK or NACK based on the determination result is outputted to control signal receiving section 207. In addition, in a subframe in which no PHICH is received, an ACK is outputted to control signal receiving section 207. Here, the terminal does not receive any PHICH serving as a retransmission instruction for the PUSCH to which a resource is assigned by the UL grant of an E-PDCCH.

In this way, in the present embodiment, it is defined that, when a resource assigned by the UL grant through an E-PDCCH, no PHICH is used for a retransmission instruction for the PUSCH assigned by an E-PDCCH as described above. Therefore, the terminal does not receive a PHICH corresponding to a PUSCH assigned by an E-PDCCH. On the other hand, the terminal receives a PHICH corresponding to a PUSCH assigned by a PDCCH.

Thereby, the use of a PHICH can be switched dynamically as compared with Embodiment 1. More specifically, in a subframe in which both a PDCCH and an E-PDCCH are monitored, when a PHICH is used for the next retransmission instruction, a PUSCH is assigned by a PDCCH. On the other hand, when no PHICH is used for the next retransmission instruction, a PUSCH is assigned by an E-PDCCH. Thereby, the use of a PHICH can be switched dynamically.

Moreover, when power is increased using an E-PDCCH for a terminal with low reception quality at a cell edge, or when transmission is performed while directing a beam to enhance the reception quality for such a terminal, the terminal with low reception quality may be not able to receive a PDCCH and a PHICH due to the low reception quality.

In the present embodiment, if an E-PDCCH is transmitted to such a terminal in the first transmission, the terminal dose not receive a PHICH with low reception quality even if a subframe in which the retransmission instruction is issued is not a subframe in which an E-PDCCH is monitored. This enables suspending until retransmission can be instructed next through an E-PDCCH. Moreover, when a PDCCH with a high aggregation level is available, a retransmission instruction can be received through a PDCCH. In this way, when power control is performed in units of terminals, Embodiment 2 is effective particularly.

Figure 7:
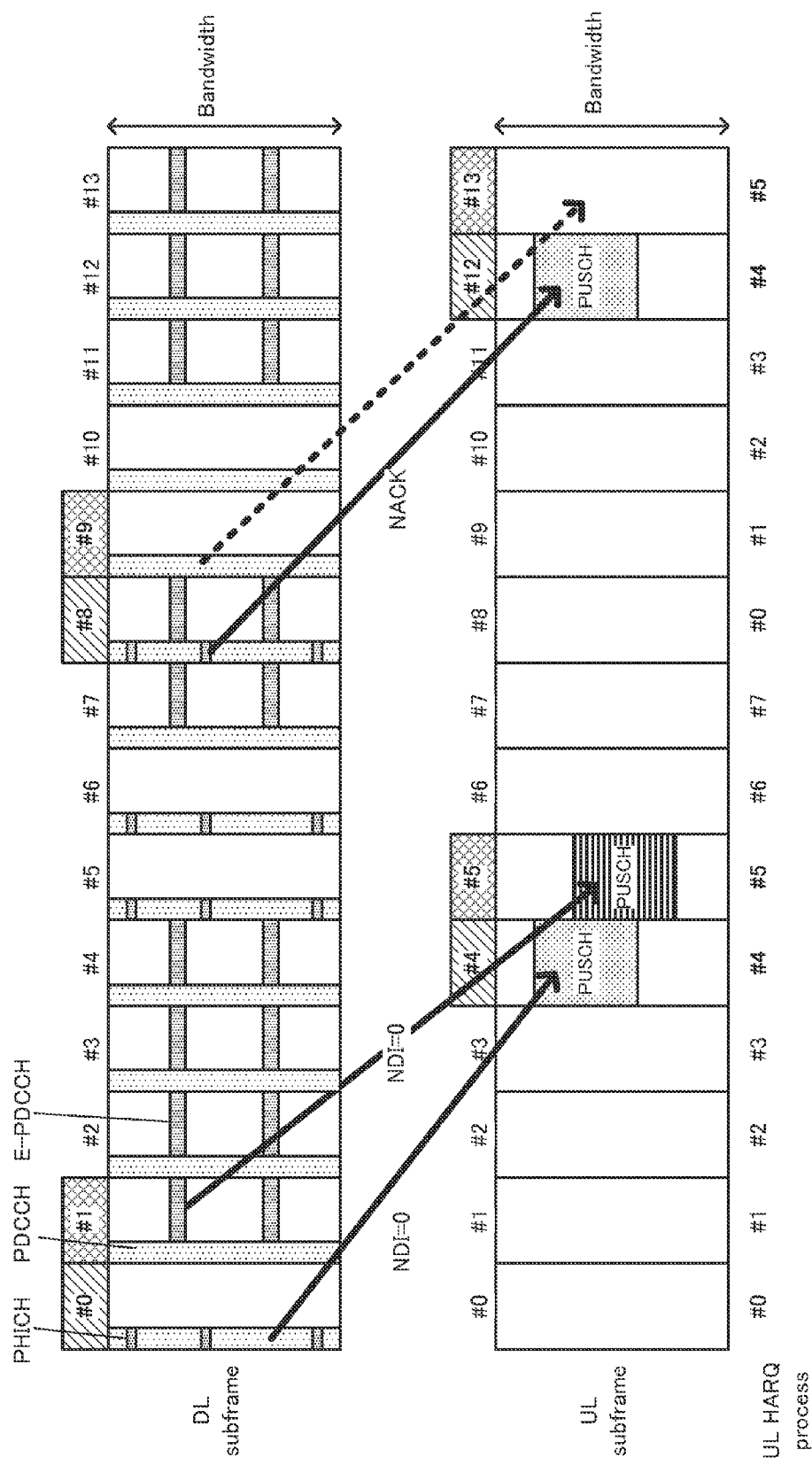
FIG. 7 illustrates an explanation of a retransmission control according to Embodiment 2 of the present invention.

Next, a retransmission control between the base stations and the terminal according to Embodiment 2 of the present invention will specifically be explained taking FDD as an example with reference to FIG. 7.

For example, in DL subframes #1 to 4, 7, 8, and 11 to 13, an E-PDCCH is set so as to be monitored. A PDCCH is also used concomitantly in a subframe in which an E-PDCCH is monitored. The terminal does not receive a PHICH corresponding to a PUSCH assigned through an E-PDCCH.

In FIG. 7, a new PUSCH of UL subframe #4 is assigned by the UL grant in the PDCCH region of DL subframe #0. UL subframe #4 corresponds to UL HARQ process #4. Similarly, a new PUSCH of UL subframe #5 is assigned by the UL grant in the E-PDCCH region of DL subframe #1. UL subframe #5 corresponds to UL HARQ process #5.

The retransmission instruction for the PUSCH transmitted in UL subframe #4 is issued in DL subframe #8, which corresponds to the fourth subframe from UL subframe #4. Therefore, the terminal receives a PHICH in DL subframe #8. Additionally, the retransmission instruction for a PUSCH transmitted in UL subframe #5 is issued in DL subframe #9, which corresponds to the fourth subframe from UL subframe #5. Therefore, the terminal does not receive PHICH in DL subframe #9.

If receiving PHICH=NACK in DL subframe #8 and not detecting a UL grant in a PDCCH or E-PDCCH, the terminal transmits a retransmission signal in UL subframe #12 (UL HARQ process #4) using the same resource (by non-adaptive retransmission). On the other hand, in DL subframe #9, the transmission of the retransmission signal is instructed through a PDCCH. Here, due to no retransmission instruction through a PDCCH, suspending is enabled, and the terminal does not transmit any retransmission signal in UL subframe #13.

In this way, according to Embodiment 2, it is defined that a PHICH is not used for a retransmission instruction of a PUSCH assigned by an E-PDCCH when a resource is assigned by the UL grant through an E-PDCCH. The retransmission instruction corresponding to this case is issued by the UL grant. Thereby, in a subframe in which both a PDCCH and an E-PDCCH are monitored, a PDCCH is used for the assignment when a PHICH is used for the next retransmission instruction, and an E-PDCCH is used for the assignment when a PHICH is not used for the next retransmission instruction. Thereby, according to whether the operation of a PHICH is suitable, the use of a PHICH can be switched dynamically.

Embodiment 3

Embodiment 3 of the present invention will be explained in the case where the presence or absence of a PHICH is controlled in cooperation with a measurement set for measuring the DL channel quality.

In LTE-A, a situation where the interference level differs in each DL subframe occurs. In particular, such a situation occurs in the case where an ABS (Almost Blank Subframe) is configured. An ABS is a subframe in which the base station reduces transmission power (including the case where no transmission is performed in the subframe). For example, a subframe which is configured as an ABS by cell A is a subframe with small interference for neighboring cell B. The information regarding the ABS configuration is information exchanged between base stations and is not indicated to the terminal.

For this reason, since the terminal does not know the ABS configuration, such a scheme has been introduced that the terminal selects only a subframe in a certain interference state (assuming that an ABS or a non-ABS is configured in another cell), measures the channel quality and reports the measurement result to the base station. The base station indicates which subframes can be assumed to have the same interference states as one another, to the terminals, with a bit string called a measurement set. The terminal measures the channel quality of a limited subframe with the measurement set and reports the measurement result to the base station. In this way, measurement of the channel quality of only subframes in a certain interference state improves the accuracy of channel quality estimation. In other words, this reduces the difference between the channel quality which has been reported to the base station by the terminal and the channel quality when the terminal receives a signal through a subframe in which the base station has transmitted a signal in reality. However, if the channel quality of a certain subframe is measured and reported from among subframes having different interference states, the difference between the reported channel quality and the channel quality of a subframe in which signals assigned actually may increase.

Moreover, measurement patterns include CSI (Channel State Information) measurement and mobility measurement. CSI measurement is measurement used for scheduling in the base station. More specifically, this measurement is used for measuring, for example, the average of the whole band, the channel quality of a division band resource obtained by dividing a band, called a sub-band, a rank number receivable during MIMO transmission, and precoding with excellent properties.

When subframes in which CSI measurement is performed are limited, the patterns of subframes (referred to as subframe sets) are set to two subsets. For example, subset 1 is set as subframes #0, 1, 5, 6, 7, 9, . . . (set up to subframe #39, i.e., in a 40-subframe cycle, and subset 2 is set as subframes #2, 3, 8, . . . (set up to subframe #39). There may be a subframe not included in either one of the subsets.

On the other hand, mobility measurement indicates the channel quality of a connected cell and a neighboring cell and is used in order to for the base station to judge whether the terminal is moved to the neighboring cell. Reference signal received power (RSRP) averaged for a longer period than CSI and reference signal received quality (RSRQ) are used, for example. When subframes for mobility measurement are limited, patterns of subframes are set as one subset for a connected cell and as one subset for a neighboring cell. This is because the subframe receiving larger interference differs depending on the cell. This measurement set is also indicated in a 40-subframe cycle.

The configuration of the base station according to Embodiment 3 of the present invention is the same as the configuration illustrated in FIG. 4 of Embodiment 1, and the configuration of the terminal according to Embodiment 3 of the present invention is the same as the configuration illustrated in FIG. 5 of Embodiment 1, except that the operations of PHICH generating section 103 of base station 100 and PHICH receiving section 206 of terminal 200 differ depending on the following cases (A-1) and (A-2).

(A-1) PHICH generating section 103 of base station 100 and PHICH receiving section 206 of terminal 200 limit the use of a PHICH in cooperation with a CSI measurement set. In this case, it is associated that no PHICH is used in the use of one of the two subsets as a CSI measurement set and that a PHICH is used in the use of the other subset. Which subset to associate with the use of a PHICH may be indicated by new signaling or may beforehand be determined in the system.

(A-2) When PHICH generating section 103 of base station 100 and PHICH receiving section 206 of terminal 200 operate with a mobility measurement set, they are associated with the setting in which no PHICH is used in the use of one of a subset used for a connection cell and a subset configured for a neighboring cell and a PHICH is used in the use of the other subset. Which subset to associate with the use of a PHICH may be indicated by additional signaling. Moreover, whether a PHICH is used for a subframe reported so as to be measured using a measurement set or for a subframe indicated so as not to be measured may be reported by additional signaling.

In this way, according to Embodiment 3, association with the setting in which a PHICH is used in one of two subsets in a CSI measurement set or a mobility measurement set and no PHICH is used in the other subset. Thereby, the use of a PHICH can be linked with an interference state, and no PHICH can be assigned only to a terminal at a cell edge.

In addition, although an ABS subframe is not indicated to a terminal at present, the presence or absence of a PHICH may be determined in conjunction with an ABS subframe if an ABS subframe is indicated to a terminal.

Moreover, if a subframe for indicating an interference situation of each subframe is newly added in addition to an ABS subframe, the presence or absence of a PHICH may be determined in conjunction with the indication.

Embodiment 4

Embodiment 4 of the present invention will be explained in the case of setting whether a PHICH is used in conjunction with setting of an MBSFN subframe.

An MBSFN subframe is a subframe defined for transmitting MBMS (Multimedia Broadcast Multicast Service) data. Although data cannot be assigned to a terminal demodulating data using a CRS since there is no CRS in the data region, a DMRS (Demodulation Reference signal) can be used in LTE-A to assign data to a terminal. Whether a PHICH is used in an MBSFN subframe or in a subframe that is not an MBSFN subframe (non-MBSFN subframe) may separately be indicated by additional signaling or may beforehand be determined in the system.

The configuration of the base station according to Embodiment 4 of the present invention is the same as the configuration illustrated in FIG. 4 of Embodiment 1, and the configuration of the terminal according to Embodiment 4 of the present invention is the same as the configuration illustrated in FIG. 5 of Embodiment 1, except that the operations of PHICH generating section 103 of base station 100 and PHICH receiving section 206 of terminal 200 differ depending on the following cases (B-1) and (B-2).

(B-1) First, the case will be explained where PHICH generating section 103 of base station 100 and PHICH receiving section 206 of terminal 200 use a PHICH in an MBSFN subframe and do not use a PHICH in a non-MBSFN subframe.

An MBSFN subframe has no CRS and is therefore suitable for MU-MIMO for multiplexing signals of multiple terminals using DMRSs. Therefore, when there are many terminals performing MU-MIMO, the availability of control signal regions (PDCCH and E-PDCCH) becomes tight. Consequently, in an MBSFN subframe, the resource amount used for control signals can be reduced by using a PHICH. It is assumed that a probability of MU-MIMO multiplexing is low for a terminal with such low reception quality that reception of a PHICH is difficult. As a result, a terminal subject to MU-MIMO is assumed to have high reception quality of a PHICH and can therefore receive a PHICH.

(B-2) Next, the case will be explained where PHICH generating section 103 of base station 100 and PHICH receiving section 206 of terminal 200 use no PHICH in an MBSFN subframe and use a PHICH in a non-MBSFN subframe.

An MBSFN subframe has no CRS unlike the scenario of MU-MIMO of (B-1) described above and may therefore be used as an interference control subframe. As a result, an MBSFN subframe serves as a subframe receiving interference or a subframe causing interference. Using no PHICH in an MBSFN subframe can prevent using a PHICH difficult to be received in a subframe receiving interference from another cell or causing interference to another cell by a PHICH in a subframe causing interference. In particular, the largest number of OFDM symbols in a PDCCH region in an MBSFN subframe is small in comparison with that in a non-MBSFN subframe, therefore leading to a low effect of power boosting of a PHICH. Therefore, it is difficult to receive a PHICH in a subframe receiving interference.

In this way, Embodiment 4 sets whether to use a PHICH in conjunction with setting of an MBSFN subframe and thereby achieve the following. (1) A shortage of control signal regions due to terminals subject to MU-MIMO multiplexing can be lightened when a PHICH is used in an MBSFN subframe and is not used in a non-MBSFN subframe. (2) It is possible to prevent using a PHICH difficult to be received in a subframe receiving interference and causing interference to another cell by a PHICH in a subframe giving interference can be prevented when a PHICH is not used in an MBSFN subframe and is used in a non-MBSFN subframe.

Embodiment 5

Embodiment 5 of the present invention will be explained in the case where whether to use a PHICH is determined on the basis of $N_g \in \{1/6, 1/2, 1, 2\}$ that is a coefficient for determining the number of PHICHs.

$N_g \in \{1/6, 1/2, 1, 2\}$ is a value indicated by signaling in a higher layer and is used for following Equation 1 determining the number of PHICH groups. As a result, an increase in the value of $N_g$ increases the number of PHICHs which can be transmitted in one subframe.

(Equation 1)

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad [1]$$

The configuration of the base station according to Embodiment 5 of the present invention is the same as the configuration illustrated in FIG. 4 of Embodiment 1, and the configuration of the terminal according to Embodiment 5 of the present invention is the same as the configuration illustrated in FIG. 5 of Embodiment 1, except that the operations of PHICH generating section 103 of base station 100 and PHICH receiving section 206 of terminal 200 involve the presence of a PHICH in the case of $N_g \geq P$ and the absence of a PHICH in the case of $N_g < P$. However, the present embodiment uses $P \in \{1/2, 1, 2\}$ as an example. That is, the value of $N_g$ can be increased to use a PHICH in the case where there are many terminals subject to MU-MIMO multiplexing, and the value of $N_g$ can be decreased to use no PHICH in the case of a small number of PHICHs which can be transmitted in one subframe. The value of P is beforehand determined in the system, or may differ in each terminal.

In this way, Embodiment 5 determines whether to use a PHICH in conjunction with coefficient $N_g$ determining the number of PHICHs. Thereby, the value of $N_g$ can be increased to use a PHICH together with an E-PDCCH in the case where there are many terminals subject to MU-MIMO multiplexing, and the value of $N_g$ can be decreased to use no PHICH in the case of a small number of PHICHs which can be transmitted in one subframe.

In addition, the present embodiment is more effective when used in combination with the other embodiments. For example, in combination with Embodiment 1, although it is defined that a PHICH is not used in a subframe in which an E-PDCCH is monitored, a PHICH may be used even in a subframe in which an E-PDCCH is monitored when $N_g \geq P$. In this way, whether each of the above-described embodiments is applied for each cell can be set according to the value of Ng.

Embodiment 6

Embodiment 6 of the present invention will be explained in the case where the presence or absence of a PHICH is indicated using a bit in the UL grant.

Although a UL grant is transmitted in DCI (DL Control Information) format #0 or 4, the number of formats may increase in the future.

The base station indicates the presence or absence of a PHICH using information on the DCI format forming the UL grant. The terminal judges whether there is a PHICH for the PUSCH assigned by the UL grant, on the basis of bits in the UL grant. If the presence or absence of a PHICH can be indicated by the UL grant in this manner, the presence or absence of a PHICH can be switched dynamically.

The bit in the UL grant is provided by adding a new dedicated bit or using a bit for other information. When a bit for other information is used, it is possible to use bits for indicating a cyclic shift of a DMRS. The bits consist of three bits, and a cyclic shift value is defined as "0, 2, 3, 4, 6, 8, 9, and 10" and is indicated from the base station to the terminal using three bits.

In setting of these cyclic shift values, it is assumed that indicating a certain shift value represents the absence of a PHICH, the other shift values represent the presence of a PHICH. In particular, the cyclic shift values of 3 and 9 are consecutive to other shift values and are unlikely to be used during MU-MIMO. Therefore, if the cyclic shift values of 3 and 9 are set to represent the absence of a PHICH while the other cyclic shift values set to represent the presence of a PHICH, this setting provides an advantage of allowing easier association with the operations of MU-MIMO.

The embodiments have been explained thus far.

(C-1) Extension of the Present Invention to Carrier Aggregation

In the case of non-cross carrier scheduling, cell-specific configuration such as using a PHICH in Pcell (Primary cell) and not using a PHICH in Scell (Secondary cell), is possible. Meanwhile, in the case of cross carrier scheduling, the configuration in the Pcell is used since a PHICH is available only in Pcell.

(C-2) Extension of the Present Invention to Extension Carrier

An extension carrier is a carrier in which signals to be mapped in a region determined in units of cells, such as a PDCCH, PHICH, PCFICH, CRS, and the like are not mapped. Possible schemes of assigning a data region using an extension carrier include applying cross carrier scheduling to transmit a control signal from a carrier that is not an extension carrier, and using an E-PDCCH region in which a resource is assigned to each UE.

The case of applying cross carrier scheduling follows the configuration of the carrier that transmits a control signal. Alternatively, it is possible to define that no PHICH is used for an extension carrier. When an E-PDCCH is used for assignment, no PHICH is used in an extension carrier.

(C-3) Extension to SPS (Semi Persistent Scheduling)

Schemes of assigning DL data and UL data include dynamic scheduling and semi persistent scheduling (SPS). Dynamic scheduling indicates a resource for first transmission for each subframe using DL assignment or UL grant. In SPS, first transmission of HARQ (Hybrid ARQ) is periodically transmitted with the same resource until indication of completion is acquired after the resource is indicated by DL assignment or UL grant.

Here, the term "first transmission" refers to the initial transmission of HARQ and corresponds to the operation of retransmission using the resource indicated by the retransmission instruction or the same resource according to a retransmission instruction when a PHICH is used by UL even in the case of both dynamic scheduling and SPS during retransmission. When assignment to small packets for, for example, audio communication, is indicated using a control signal each time, the overhead for control signals increases relative to the amount of the packets. Therefore, SPS is suitable for the case where small packets for, for example, audio communication occur continuously. Therefore, use of a PHICH is an effective scenario in this case.

Consequently, a PHICH is used for assignment using SPS as exception handling. Thereby, when the overhead for control signals is large in comparison with the data volume, retransmission can be indicated by a PHICH, and the resources for control signals can be used effectively.

In addition, the operations of each of the embodiment described above are implemented only in specific terminals and are not implemented in LTE terminals or rel. 10 LTE-A terminals, thereby maintaining backward compatibility. Moreover, these operations may be applied only to terminals supporting an E-PDCCH or CoMP. Those terminals can be distinguished using the category, rel. number, or the like of the terminals. Moreover, these operations may not be applied to terminals having a specified TM (Transmission mode) supporting UL MIMO.

If these operations are not applied to terminals (configured with DCI format 4) supporting UL MIMO transmission, a PHICH can positively be used during MU-MIMO.

In the embodiments described above, the present invention is configured with hardware by way of example, but the invention may also be provided by software in concert with hardware.

In addition, the functional blocks used in the description of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than LSI. After fabrication of LSI, a field programmable gate array (FPGA), which is programmable, or a reconfigurable processor that allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, drawings, and abstract included in Japanese Patent Application No. 2011-176864, filed on Aug. 12, 2011, is incorporated herein by reference in its entirety.

INDUSTRIAL APPLICABILITY

The communication apparatus and retransmission control method according to the present invention can be applied to, for example, a mobile communication system represented by LTE-A.

REFERENCE SIGNS LIST

100 Base station
101 Error detection section
102 Assignment information generating section
103 PHICH generating section
104, 208 Error correction coding section
105, 209 Modulation section
106, 210 Signal assignment section
107, 211 Radio transmission section
108, 201 Antenna
109, 202 Radio receiving section
110, 204 Demodulation section
111, 205 Error correction decoding section
200 Terminal
203 Signal demultiplexing section
206 PHICH receiving section
207 Control signal receiving section

The invention claimed is:

1. A communication apparatus comprising:
   a physical HARQ indicator channel (PHICH) receiver that, when receiving a PHICH including an ACK or NACK transmitted from another communication apparatus without using cross-carrier scheduling, does not use the PHICH in one or more secondly cells, but uses the PHICH received in a primary cell; and
   a retransmission controller that, in operation, controls whether to perform retransmission to the other communication apparatus, based on the received and used PHICH and assignment control information.

2. The communication apparatus according to claim 1, wherein the PHICH receiver, in operation, receives and uses the PHICH in one of two subsets in a channel state information (CSI) measurement set or a mobility measurement set and does not use the PHICH in the other one of the two subsets.

3. The communication apparatus according to claim 1, wherein the PHICH receiver, in operation, receives and uses the PHICH in an MBMS single frequency network (MBSFN) subframe, but does not use the PHICH in a non-MBMBSFN subframe.

4. The communication apparatus according to claim 1, wherein the PHICH receiver, in operation, does not use the PHICH in an MBMS single frequency network (MBSFN) subframe, but receives and uses the PHICH in a non-MBSFN subframe.

5. The communication apparatus according to claim 1, wherein the PHICH receiver, in operation, determines whether to receive and use the PHICH, based on the number of PHICHs.

6. A communication apparatus comprising:
   a physical HARQ indicator channel (PHICH) receiver that, when receiving a PHICH including an ACK or NACK transmitted from another communication apparatus without using cross-carrier scheduling, does not a use the PHICH corresponding to a physical uplink shared channel (PUSCH) assigned to one or more secondly cells, but uses the PHICH corresponding to a PUSCH assigned to a primary cell; and
   a retransmission controller that, in operation, controls whether to perform retransmission to the other communication apparatus, based on the received and used PHICH and assignment control information.

7. A retransmission control method comprising:
   when a first communication apparatus receives a physical HARQ indicator channel (PHICH) including an ACK or NACK transmitted from a second communication apparatus without using cross-carrier scheduling, the first communication apparatus not using the PHICH in one or more secondary cells, but the first communication apparatus using the PHICH received in a primary cell; and
   the first communication apparatus controlling whether to perform retransmission to the second communication apparatus, based on the received and used PHICH and assignment control information.

8. A retransmission control method comprising:
   when a first communication apparatus receives a physical HARQ indicator channel (PHICH) including an ACK or NACK transmitted from a second communication apparatus without using cross-carrier scheduling, the first communication apparatus not using the PHICH corresponding to a physical uplink shared channel (PUSCH) assigned to one or more secondary cells, but the first communication apparatus using the PHICH corresponding to a PUSCH assigned to a primary cell; and the first communication apparatus controlling whether to perform retransmission to the second communication apparatus, based on the received and used PHICH and assignment control information.

\* \* \* \* \*